United States Patent
Jang

(10) Patent No.: US 7,164,673 B2
(45) Date of Patent: Jan. 16, 2007

(54) METHOD OF MANAGING RADIO BEARER IN MOBILE COMMUNICATION SYSTEM

(75) Inventor: Min Jang, Seoul (KR)

(73) Assignee: LG-Nortel Co., Ltd., Seoul (KR)

( * ) Notice: Subject to any disclaimer, the term of this patent is extended or adjusted under 35 U.S.C. 154(b) by 278 days.

(21) Appl. No.: 10/628,402

(22) Filed: Jul. 29, 2003

(65) Prior Publication Data
US 2004/0052246 A1    Mar. 18, 2004

(30) Foreign Application Priority Data
Sep. 12, 2002    (KR) ............... 10-2002-0055404

(51) Int. Cl.
*H04Q 7/24*    (2006.01)
(52) U.S. Cl. .............. 370/338; 370/338; 370/352; 370/395.5; 455/552.1
(58) Field of Classification Search ........ 370/338–349, 370/352–395.5, 395.52, 395.21, 412; 455/552.1, 455/553.1
See application file for complete search history.

(56) References Cited

U.S. PATENT DOCUMENTS

2002/0133600 A1 * 9/2002 Williams et al. ........... 709/228
2003/0117983 A1 * 6/2003 Ton et al. .................. 370/338
2003/0156578 A1 * 8/2003 Bergenlid et al. ........... 370/352
2004/0064555 A1 * 4/2004 Cuny et al. ................ 709/225
2004/0184440 A1 * 9/2004 Higuchi et al. ............. 370/349
2004/0203778 A1 * 10/2004 Kuo et al. ................. 455/436
2004/0224719 A1 * 11/2004 Nounin et al. ............ 455/553.1

FOREIGN PATENT DOCUMENTS

KR    2003-0058415    7/2003
WO    99/17497        4/1999

OTHER PUBLICATIONS

Korean Office Action dated Mar. 25, 2005.
Office Action issued by Chinese Patent Office Dec. 31, 2004.

* cited by examiner

*Primary Examiner*—John Pezzlo
*Assistant Examiner*—Inder Pal Mehra
(74) *Attorney, Agent, or Firm*—Fleshner & Kim, LLP

(57) ABSTRACT

A system and method of managing a radio bearer in a mobile communication system is provided which releases an assigned radio bearer while maintaining Packet Data Protocol (PDP) Context information related to a subscriber's Packet Session. This improves efficiency of use of the radio bearer. Also, in a case in which a user desires a temporary service interruption, the PDP context is preserved. Thus, it is possible to prevent accrual of fees associated with undesired service, thereby decreasing overall fees to subscribers.

32 Claims, 2 Drawing Sheets

METHOD OF MANAGING RADIO BEARER IN MOBILE COMMUNICATION SYSTEM

BACKGROUND OF THE INVENTION

1. Field of the Invention

The present invention generally relates to a mobile communication system, and more particularly, to a method of managing a radio bearer of a mobile communication system.

2. Background of the Related Art

A general Packet Radio Service (GPRS) network is a wire network of a mobile service provider which provides a packet service. A related-art communication network and system for providing the packet service is shown in FIG. 1. This system includes a Gateway GPRS Support Node (GGSN) 15, a Serving GPRS Support Node (SGSN) 13, a Home Location Register (HLR) 14, a Universal Terrestrial Radio Access Network (UTRAN) 12 and a Mobile Station (NIS) 11.

The GGSN 15 functions as a gateway to be connected With Internet Protocol (IP) Network 16, and the SGSN 13 is connected to the GGSN 15 via the GPRS network for managing mobility of the MS 11 of a packet mode. The SGSN 13 also serves as a packet switch. The HLR 14 is connected to the GGSN 15 and the SGSN 13 for managing a subscriber's subscription information and a subscriber's location information. The UTRAN 12 manages a radio bearer and transmits data by allocating traffic channels.

A method for allocating and releasing a radio bearer in the aforementioned general packet mobile communication system will now be explained. In order to receive the GPRS of the packet service, a packet service subscriber registers his own location in the SGSN 13 via the MS 11. Upon registering the location of the subscriber via the MS 11, the SGSN 13 takes service information of the subscriber from the HLR 14. The SGSN 13 then performs the process for activating a Packet Data Protocol (PDP) context to set a Packet Session. That is, a radio source is assigned between the MS 11 and UTRAN 12 according to the desired quality of service. When setting the Packet Session by the process for activating the PDP context, the packet service is provided to the MS 11.

Next, if the subscriber desires to terminate the service, the SGSN 13 deactivates the PDP context by the process for deactivating the PDP context, and releases the assigned radio source. At this time, the GPRS packet service performs a PDP context Preservation function according to rarity of importance of the radio bearer. According to the PDP context Preservation function, the UTRAN 12 judges the necessity of releasing the radio bearer in case of User Inactivity or temporary cut-off of the radio bearer, and releases the radio bearer temporarily by an operation with the SGSN 13.

FIG. 2 is a signal flow chart illustrating the process of setting Radio Access Bearer (RAB) Release Request to release the radio bearer for the PDP context preservation function of the GPRS packet service. If the User Inactivity or the temporary cut-off of the radio bearer is detected, the UTRAN 12 sends the RAB Release Request message to the SGSN 13 (201). At this time, it is possible to request releasing the plurality of radio bearers simultaneously. The SGSN 13 receiving the RAB Release Request message sends a RAB Assignment Request message to the UTRAN 12 to release the radio bearer (S202). Therefore, a radio bearer is released between the UTRAN 12 and the MS 11 (S203), and the released radio bearer may be used in service for another subscriber. Then, the UTRAN 12 sends a RAB Assignment Response message to the SGSN 13 to respond the RAB Release Request message (S204). At this time, information for re-setting the radio bearer is maintained.

For receiving the packet service again following the PDP context preservation, the subscriber has to send a Service Request message to the SGSN 13 via the MS 11 to request the allocation of the radio bearer.

In the related art method of managing the radio bearer in the mobile communication system, the PDP context preservation function is performed according to the UTRAN 12 without determination of the subscriber. That is, the UTRAN 12 periodically checks the User Inactivity. When the User Inactivity generates for a predetermined time period, the radio bearer is released and the PDP context is preserved. Thus, until the UTRAN 12 checks the User Inactivity, the radio bearer cannot be used for another, which results in wasting the radio bearer.

The time period for maintaining the packet service is longer than that for maintaining a general circuit service of telephone communication network, so that the user may want to intentionally discontinue the service due to various reasons. For instance, the user may desire to discontinue the packet service due to the cut-off of the packet service by web server connection and e-mail, call or urgent business.

However, in the related art method of managing the radio bearer in the mobile communication system, the PDP context preservation function is performed according to the UTRAN 12 without determination of the subscriber. Therefore, the user has to deactivate the PDP context in order to terminate the service, which substantially decreases the efficiency of use of the radio bearer.

SUMMARY OF THE INVENTION

An object of the present invention is to provide a system and method of managing a radio bearer in a mobile communication system that substantially obviates one or more problems due to limitations and disadvantages of the related art.

Another object of the present invention is to provide a system and method of managing a radio bearer in a mobile communication system, in which the radio bearer is released in a state of maintaining Packet Data Protocol (PDP) Context information to a subscriber's Packet Session, thereby improving efficiency of use of the radio bearer.

To achieve these and other objects and advantages of the present invention, a first embodiment of a method of managing a radio bearer in a mobile communication system includes requesting a packet service interruption via a subscriber's MS, and releasing a radio bearer assigned between the MS and a UTRAN while maintaining a Packet Data Protocol Context message in the MS.

A second embodiment of a method of managing a radio bearer in a mobile communication system having a mobile station (MS), a UTRAN and a SGSN includes a first step in which the MS transmits a Preserve PDP Context Request message corresponding to a service interruption session to the SGSN; a second step in which the UTRAN releases a radio bearer assigned in the corresponding MS; and a third step in which the SGSN transmits a Preserve PDP Context Accept message to the MS.

The method further includes a step in which the SGSN receiving the Preserve PDP Context Request message requests the release of the radio bearer corresponding to the service interruption session to the UTRAN after the first step, and a step in which the UTRAN transmits a Response message for the radio bearer release result to the SGSN after the second step. The Preserve PDP Context Request message is comprised of a Protocol discriminator, a Transaction ID, a Preserve PDP Context Request message ID, a Session Management (SM) cause value, a Tear Down indicator. The Protocol discriminator, the Transaction ID, the Preserve PDP Context Request message ID and the SM cause value are mandatory elements M, and the Tear Down indicator is an optional element O.

Respective formats of the Protocol discriminator, the Transaction ID, the Preserve PDP Context Request message ID, the SM cause value have only Value, and a format of the Tear Down indicator has Type and Value.

The SM cause value is a cause value for a temporary service interruption.

The SM cause value is used of User Inactivity value.

The Preserve PDP Context Accept message is comprised of a Protocol discriminator, a Transaction ID, and a Preserve PDP Context Accept message ID.

The Protocol discriminator, the Transaction ID, and the Preserve PDP Context Accept message ID are mandatory elements, of which respective formats have only Value.

The Preserve PDP Context Request and the Preserve PDP Context Accept messages follow a form used in a Session Protocol of 3GPP.

The Preserve PDP Context Request and the Preserve PDP Context Accept messages are managed in the MS.

It is to be understood that both the foregoing general description and the following detailed description of the present invention are exemplary and explanatory and are intended to provide further explanation of the invention as claimed.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
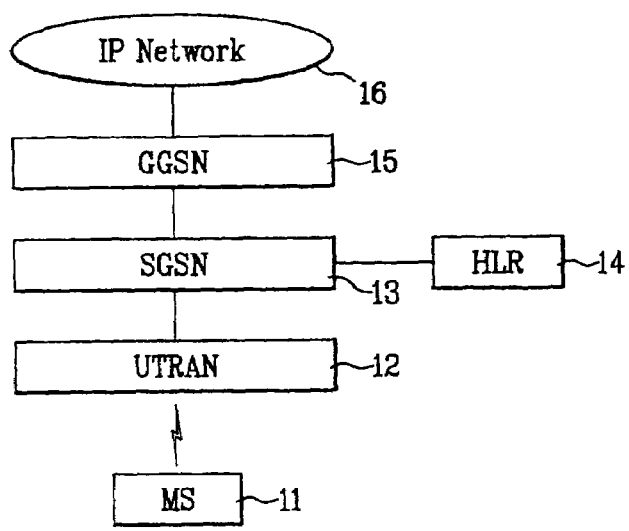
FIG. 1 is a block diagram illustrating a related-art general packet mobile communication system.
Figure 2:
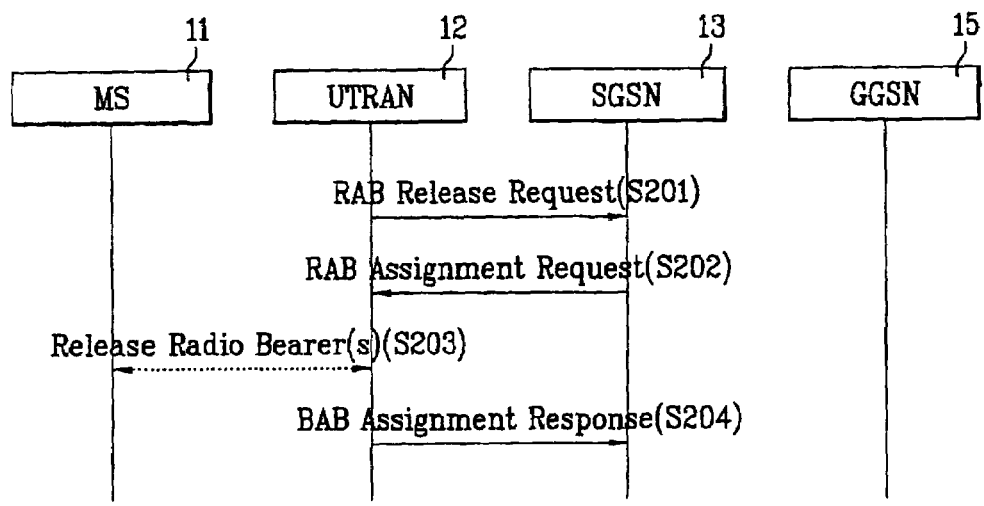
FIG. 2 is a signal flow chart illustrating a related-art process of setting Radio Access Bearer (RAB) Release Request to release a radio bearer for a PDP context preservation function of a GPRS packet service.
Figure 3:
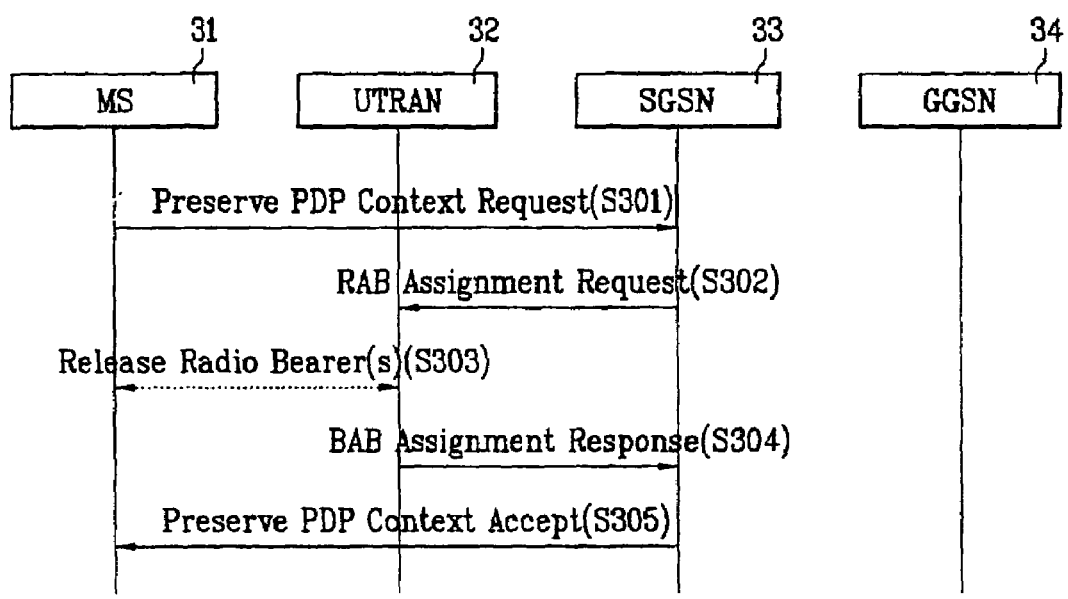
FIG. 3 is a signal flow chart illustrating the process of preserving a packet data protocol (PDP) context according to one embodiment of the present invention.

A method of managing a radio bearer in a mobile communication system according to one embodiment of the present invention will be described with reference to the accompanying drawings. FIG. 3 is a signal flow chart illustrating the process of preserving a packet data protocol (PDP) context according to the present invention. In case a subscriber desires to interrupt a packet service temporarily, the method of managing the radio bearer in the mobile communication system according to the present invention includes the process steps of transmitting a Preserve PDP Context Request message to a SGSN 33 via the subscriber's own MS 31, releasing a radio bearer, and responding to the Preserve PDP Context Request message by transmitting a Preserve PDP Context Accept message to the MS 31.

Tables 1–4 show a preferred message type and message structure according to the Preserve PDP Context Request message and the Preserve PDP Context Accept message. The message type may follow a form used in a Session Management Protocol of 3GPP, which is explained in greater detail in 3GPP Technical Specifications TS 24.008 and TS 24.007, the contents of which are incorporated by reference herein.

Table 1 shows a message format of the Preserve PDP Context Request message. The Preserve PDP Context Request message includes a Protocol discriminator, a Transaction ID, a Preserve PDP Context Request message ID, a SM (Session Management) cause value, and a Tear Down indicator.

TABLE 1

| IEI | Information Element | Type | Presence | Format | Length |
|---|---|---|---|---|---|
| | Protocol discriminator | Protocol discriminator | M | V | 1/2 |
| | Transaction ID | Transaction ID | M | V | 1/2 –3/2 |
| | Preserve PDP Context Request message ID | Message type | M | V | 1 |
| | SM cause | SM cause | M | V | 1 |
| | Tear Down indicator | Tear Down indicator | O | TV | 1 |

In this embodiment, the Protocol discriminator, Transaction ID, Preserve PDP Context Request message ID, and SM (Session Management) cause value are mandatory elements M, and the Tear Down indicator is an optional element O. In alternative embodiments, a different combination may be considered mandatory. Also, respective formats of the Protocol discriminator, Transaction ID, Preserve PDP Context Request message ID, and SM (Session Management) cause value preferably have only value V, and a format of the Tear Down indicator has type T and value V.

Table 2 shows a preferred message format of the Preserve PDP Context Accept message. The Preserve PDP Context Accept message includes a Protocol discriminator, a Transaction ID, and a Preserve PDP Context Accept message ID.

TABLE 2

| IEI | Information Element | Type | Presence | Format | Length |
|---|---|---|---|---|---|
| | Protocol discriminator | Protocol discriminator | M | V | 1/2 |
| | Transaction ID | Transaction ID | M | V | 1/2 –3/2 |
| | Preserve PDP Context Accept message ID | Message Type | M | V | 1 |

In this embodiment, the Protocol discriminator, Transaction ID, and Preserve PDP Context Accept message ID are mandatory elements M, of which respective formats have only value V. A different combination may be considered mandatory in alternative embodiments.

Table 3 shows preferred bit values of the Preserve PDP Context Request message and the Preserve PDP Context Accept message according to the PDP preservation.

TABLE 3

| Session Management Message | Bit Value |
|---|---|
| Preserve PDP Context Request message | 01010111 |
| Preserve PDP Context Accept message | 01011000 |

Table 4 shows a preferred form of the SM (Session Management) cause value to the temporary service interruption.

TABLE 4

| SM Cause Value | Bit Value |
|---|---|
| User Inactivity | 01110000 |

In this embodiment, the SM cause value uses a User Inactivity value and the Preserve PDP Context Request and the Preserve PDP Context Accept messages may be used for releasing the radio bearer while the user maintains the packet service in the MS 31, which are managed in the MS 31.

A method for preserving the PDP context according to an embodiment of the present invention will now be described with reference to FIG. 3. In case the subscriber of the packet service desires to temporarily interrupt the service during using the service, the subscriber transmits the Preserve PDP Context Request message to the SGSN 33 via the subscriber's own MS 31 (S301). At this time, the message format of the Preserve PDP Context Request message is shown in the above Table 1. The SM cause value is used of "01110000 (User Inactivity)", a cause value for the temporary service interruption. In the Preserve PDP Context Request message, the Teardown Indicator serves as a flag for preserving all corresponding PDP contexts if the plurality of PDP contexts exist in the required service.

After receiving the Preserve PDP Context Request message, the SGSN 33 analyzes the Preserve PDP Context Request message and then transmits a RAB (Radio Access Bearer) Assignment Request message for releasing the RAB(s) of the corresponding PDP context to a UTRAN 32 (S302). This results in commanding release of the RAB(s). The UTRAN 32 releases the radio bearer between the UTRAN 32 and MS 31(S303), and preferably simultaneously transmits a RAB Assignment Response message to the SGSN 33 for responding to the request for releasing the radio bearer (S304). At this time, information required for re-setting the RAB is maintained.

After releasing the corresponding radio bearer(s) through the aforementioned process, the SGSN 33 transmits the Preserve PDP ContextAccept message to the MS 31 (S305). Thus, it is notified that information of the PDP context for the packet session of the subscriber is preserved, and the radio bearer(s) are released. The service interruption process is completed by request of the subscriber via the MS 31 of the subscriber.

The method of managing the radio bearer in the mobile communication system according to the present invention therefore has at least the following advantages. First, the PDP context preservation function is performed according to the request of the service subscriber, so that there is no need to wait for the detection of the User Inactivity by the UTRAN. In other word, it is possible to prevent the radio bearer from being wasted, which thereby improves efficiency of the radio bearer as well as overall system efficiency. Also, in case the user desires to interrupt the service temporarily, the PDP context is preserved. Thus, it is possible to prevent the fee of the undesired service from being charged, which in turn, decreases overall fees to the subscriber.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method of managing a radio bearer in a mobile communication system, comprising:
   receiving a Preserve PDP Context Request message from a mobile station; and
   releasing the radio bearer assigned between the mobile station and a Universal Terrestrial Radio Access Network (UTRAN) while maintaining a Packet Data Protocol (PDP) Context message in the mobile station.

2. The method of claim 1, wherein receiving a Preserve PDP Context Request message comprises receiving a message requesting that the PDP Context be maintained in the mobile station while the radio bearer is temporarily released.

3. The method of claim 2, wherein the Preserve PDP Context Request message includes a Protocol discriminator, a Transaction ID, a Preserve PDP Context Request message ID, a Session Management (SM) cause value, and a Tear Down indicator.

4. The method of claim 3, wherein the Protocol discriminator, the Transaction ID, the Preserve PDP Context Request message ID, and the SM cause value are mandatory elements, and the Tear Down indicator is an optional element.

5. The method of claim 2, wherein releasing the radio bearer further comprises transmitting a Preserve PDP Context Accept message to the mobile station.

6. The method of claim 5, wherein the Preserve PDP Context Accept message includes a Protocol discriminator, a Transaction ID, and a Preserve PDP Context Accept message ID.

7. The method of claim 6, wherein the Protocol discriminator, the Transaction ID, and the Preserve PDP Context Accept message ID are mandatory elements, of which respective formats have only Value.

8. A method of managing a radio bearer in a mobile communication system, comprising:
 (a) transmitting from a mobile station a Preserve Packet Data Protocol (PDP) Context Request message corresponding to a service interruption session;
 (b) releasing the radio bearer assigned to the mobile station; and
 (c) transmitting a Preserve PDP Context Accept message to the mobile station.

9. The method of claim 8, further comprising:
 requesting the release of the radio bearer corresponding to the service interruption session after step (a).

10. The method of claim 8, further comprising: transmitting a Response message indicating the radio bearer has been released after step (b).

11. The method of claim 8, wherein the Preserve PDP Context Request message includes a Protocol discriminator, a Transaction ID, a Preserve PDP Context Request message ID, a Session Management (SM) cause value, and a Tear Down indicator.

12. The method of claim 11, wherein the Protocol discriminator, the Transaction ID, the Preserve PDP Context Request message ID, and the SM cause value are mandatory elements, and the Tear Down indicator is an optional element.

13. The method of claim 11, wherein respective formats of the Protocol discriminator, the Transaction ID, the Preserve PDP Context Request message ID, and the SM cause value include only Value, and a format of the Tear Down indicator includes Type and Value.

14. The method of claim 11, wherein the SM cause value is a cause value for a temporary service interruption.

15. The method of claim 11, wherein the SM cause value is used as a User Inactivity value.

16. The method of claim 8, wherein the Preserve PDP Context Accept message includes a Protocol discriminator, a Transaction ID, and a Preserve PDP Context Accept message ID.

17. The method of claim 16, wherein the Protocol discriminator, the Transaction ID, and the Preserve PDP Context Accept message ID are mandatory elements, of which respective formats have only Value.

18. The method of claim 8, wherein the Preserve PDP Context Request and the Preserve PDP Context Accept messages follow a form used in a Session Protocol of 3GPP.

19. The method of claim 8, wherein the Preserve PDP Context Request and the Preserve PDP Context Accept messages are managed in the mobile station.

20. A system for managing a radio bearer in a mobile communications system, comprising:
 a receiver which receives a Preserve PDP Context Request message from a mobile station; and
 a controller which releases a radio bearer assigned to the mobile station while a packet data protocol (PDP) context message is maintained in the mobile station.

21. The system of claim 20, wherein the Preserve PDP Context Request message comprises a message requesting that the PDP Context be maintained in the mobile station while the radio bearer is temporarily released.

22. The method of claim 21, wherein the Preserve PDP Context Request message includes a Protocol discriminator, a Transaction ID, a Preserve PDP Context Request message ID, a Session Management (SM) cause value, and a Tear Down indicator.

23. The method of claim 22, wherein the Protocol discriminator, the Transaction ID, the Preserve PDP Context Request message ID, and the SM cause value are mandatory elements, and the Tear Down indicator is an optional element.

24. The method of claim 21, wherein the controller is configured to transmit a Preserve PDP Context Accept message when the radio bearer is released.

25. The method of claim 24, wherein the Preserve PDP Context Accept message includes a Protocol discriminator, a Transaction ID, and a Preserve PDP Context Accept message ID.

26. The method of claim 25, wherein the Protocol discriminator, the Transaction ID, and the Preserve PDP Context Accept message ID are mandatory elements, of which respective formats have only Value.

27. A system for managing a radio bearer in a mobile communications system, comprising:
 a receiver which receives from a mobile station a Preserve Packet Data Protocol (PDP) Context Request message corresponding to a service interruption session; and
 a controller which releases a radio bearer assigned to the mobile station and transmits a Preserve PDP Context Accept message to the mobile station.

28. The system of claim 27, wherein the Preserve PDP Context Request message includes a Protocol discriminator, a Transaction ID, a Preserve PDP Context Request message ID, a Session Management cause value, and a Tear Down indicator.

29. The system of claim 28, wherein the Protocol discriminator, Transaction ID, Preserve PDP Context Request message ID, and Session Management cause value are all mandatory elements, and the Tear Down is an optional element.

30. The system of claim 28, wherein respective formats of the Protocol discriminator, Transaction ID, Preserve PDP Context Request message ID, and Session Management cause value each include Value, and a format of the Tear Down indicator includes Type and Value.

31. The system of claim 28, wherein the Session Management cause value is a cause value for a temporary service interruption.

32. The system of claim 28, wherein the Session Management cause value is used as a User Inactivity value.

* * * * *